United States Patent
Gulick et al.

[15] 3,685,621
[45] Aug. 22, 1972

[54] UNIDIRECTIONAL DAMPENER

[72] Inventors: Ronald A. Gulick, Sugarland; Robert M. McEver, Jr., Houston, both of Tex.

[73] Assignee: Research Engineering Company, Houston, Tex.

[22] Filed: May 7, 1971

[21] Appl. No.: 141,216

Related U.S. Application Data

[63] Continuation-in-part of Ser. No. 70,717, Sept. 9, 1970.

[52] U.S. Cl. ............... 192/12 B, 192/17 R, 192/45, 192/58 B
[51] Int. Cl. ..................... F16d 67/02, F16d 35/00
[58] Field of Search....... 192/58 R, 58 A, 58 B, 12 A, 192/12 B, 12 BA, 17 R, 45

[56] References Cited

UNITED STATES PATENTS

| | | |
|---|---|---|
| 3,365,956 | 1/1968 | Koch .................... 192/12 BA |
| 2,217,183 | 10/1940 | Ross ........................ 192/12 B |
| 517,405 | 3/1894 | Gerbig .................... 192/12 B |
| 2,253,001 | 8/1941 | Webb et al. ............. 192/58 B |
| 2,507,182 | 5/1950 | Young, Jr. ............... 192/58 B |
| 2,858,675 | 11/1958 | Schneider ............ 192/12 A X |
| 2,863,542 | 12/1958 | Kelsey ..................... 192/58 B |

*Primary Examiner*—Allan D. Herrmann
*Attorney*—Robert W. B. Dickerson

[57] ABSTRACT

A device for controlling unsteady motion of an actuator, wherein motion in one direction is relatively unrestrained, while motion in another is restrained. A movable member is positioned within a fluid-containing chamber. The chamber itself may move in the one direction but not in the other, whereon, motion of the movable member is opposed by the fluid.

1 Claim, 2 Drawing Figures

PATENTED AUG 22 1972 3,685,621

Robert M. McEver
Ronald A. Gulick
INVENTORS

BY [signature]

ATTORNEY

UNIDIRECTIONAL DAMPENER

This is a continuation-in-part of application Ser. No. 70,717 filed Sept. 9, 1970.

BACKGROUND OF THE INVENTION

Actuators of different types of mechanisms, and particularly of valve operators, are utilized to convert one type of motion into another, and thereby to actuate the mechanism. These actuators have oftentimes experienced the problems associated with unsteady or jerky movement. An approach toward solving this problem was made by the device shown in our previously filed application. There, a rotatable disc or vane was linked to a rotating yoke. The disc or vane was positioned in a grease bath. On rotation of the disc or vane along with the yoke stem or collar, the grease resisted motion, and acted to restrain sudden accelleration, and thereby tended to make the motion more uniform. This invention takes the teachings of the earlier described patent application and further provides the mechanism whereby the restraint may be effective in only one direction. This might find utility relative to a check valve, for example.

SUMMARY OF THE INVENTION

A rotating disc is positioned within a fluid containing container. The container rotates along with the disc in one direction. Means are provided to restrict the container from rotating in the opposite direction. When the disc is caused to rotate in such opposite direction, it encounters the resistance of the fluid within the container.

DESCRIPTION OF A PREFERRED EMBODIMENT

Figure 1:
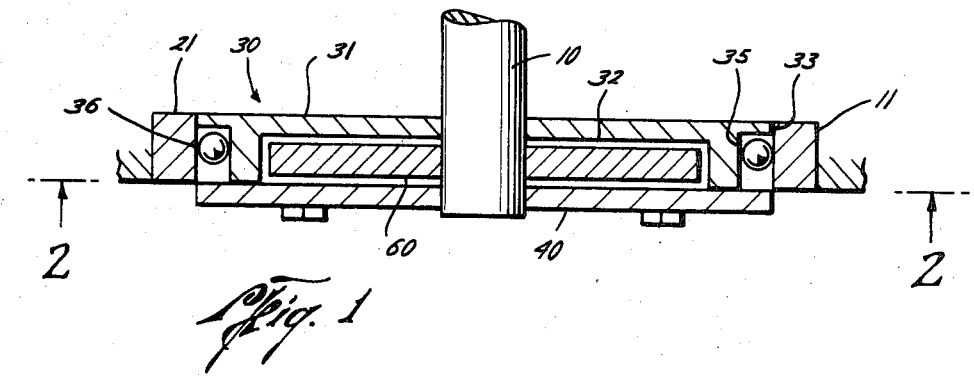
FIG. 1 is a vertical section through the container disc; and portion of related yoke
Figure 2:
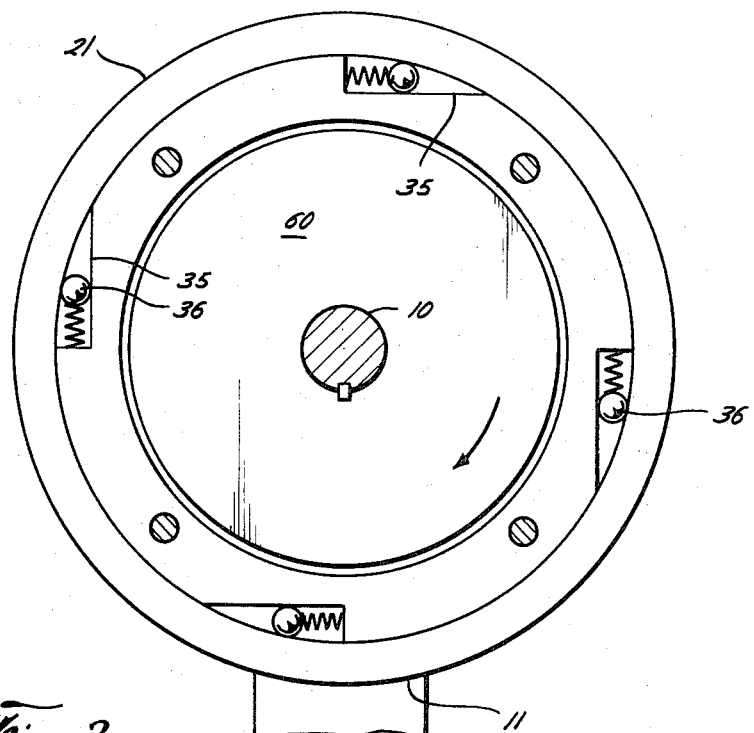
FIG. 2 is a view along lines 2—2 of FIG. 1.

The numeral 10 indicates a rotatable yoke stem or collar of an actuator device. This yoke, in a manner well known in the art, would be rotated by a mechanical, hydraulic or pneumatic force. The yoke could be keyed to a valve stem. The collar, or an extension thereof, has been taught in our earlier mentioned application to carry a disc or vane rotatable in a bath containing a viscous fluid. This tends to resist sudden accelleration and thereby to curb jerky motion.

In this operation, it is desirable to resist such accelleration in only one direction. The actuator housing is only partially depicted, and it may be fixed to the valve itself as at 11.

An annular ring member 21 is fixed to the actuator housing. Rotatably positioned axially within said ring member is the container assembly 30 described hereinbelow. Such container includes a dished portion 31, having an annular bottom 32, and side wall 33. Cover plate 40 sealingly engages the surface of said side walls, forming an internal cavity. These portions are fixed in any convenient manner to yoke collar 10 so that relative axial movement is restrained, but that the container 30 may, on sufficient force being encountered, rotate relative to the yoke. The side walls 33 of dished portion 31 may be periodically cutaway, as at 35, to receive restraining mechanisms. Such cutouts or recesses, along with the interior wall of ring 21 form wedge-appearing configurations. Within the cavity formed thereby, devices 36 may be placed which will restrain movement of the container assembly in one direction, yet permit it to rotate in the opposite one. These may take the form of a spring biased balls, as depicted. The container would be free to move in the direction of the clockwise arrows. But, on being forced in the counter-clockwise direction, the balls will tend to become wedged between members 21 and 31, thus blocking such rotation. Obviously there are substitutes for such one way braking device. For example, the cutaway portions may serve as a ratchet for a spring biased pawl carried by ring 21.

Returning now to the rotating yoke and specifically to collar 10, a disc 60 (this may be a partial disc or vane) is fixed to said collar, for rotation therewith at all times. The cavity formed between container members 31 and 40 would be substantially filled with a rather viscous substance, such as grease, and disc 60 would be positioned within the cavity.

The general operation would be as follows. As the yoke rotates in the clockwise direction, for example, disc 60 and the container assembly 30 would rotate therealong. The disc is fixed to the collar. The viscous substance carried within the cavity formed would result in the container being, in effect carried by the disc. On the direction of yoke rotation being reversed, disc 60 is carried along. However, the container assembly is restrained by the restraining mechanism, i.e., ball device 36 being wedged. On this occurring, disc 60 must move through the thick grease, with its resistance to shear. This tends to resist rapid accelleration.

In summary, a device has been described wherein a rotating member is relatively unrestrained in one direction. In the opposite direction, such motion, or accelleration thereof, is resisted. Mechanism is provided for requiring that such restraint be unidirectional. Although limited embodiments have been described, others are possible by one skilled in the art without departing from the spirit of the invention, the scope of which is limited only by the following claims:

We claim:

1. In an actuator for causing rotational movement of a related device, wherein the actuator includes a rotatable stem, the improvement comprising:
   means for reducing unsteady rotation of said stem,
   said reducing means including;
   a fluid container affixed to said stem in such a manner as to bar relative axial movement but to permit relative rotational movement on said stem,
   a supply of viscous fluid provided in the interior of said container,
   a rotatable plate member fixed to said stem within said interior of said container, and
   one way braking device for blocking rotational movement of said container in only one direction, said braking device including a ring member fixed to the housing of said actuator circumscribing said container and a plurality of ball-and-spring motion blocking members positioned within a plurality of wedge-shaped cut out portions of said container adjacent said circumscribed ring member, whereby said plate and container may rotate in unison in one direction, but in the other direction motion of said container is blocked and rotation of said plate member in said other direction is restricted by said viscous fluid.

* * * * *